(12) United States Patent
Meder et al.

(10) Patent No.: US 7,149,399 B2
(45) Date of Patent: Dec. 12, 2006

(54) GLASS BONDED FIBER ARRAY AND METHOD FOR THE FABRICATION THEREOF

(75) Inventors: Martin G. Meder, Neenah, WI (US); William Stacy, Blacksburg, VA (US); Mindaugas F. Dautartas, Blacksburg, VA (US); Dan A. Steinberg, Blacksburg, VA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 0 days.

(21) Appl. No.: 10/488,569

(22) PCT Filed: Sep. 9, 2002
(Under 37 CFR 1.47)

(86) PCT No.: PCT/US02/28765

§ 371 (c)(1),
(2), (4) Date: Apr. 18, 2005

(87) PCT Pub. No.: WO03/023460

PCT Pub. Date: Mar. 20, 2003

(65) Prior Publication Data
US 2005/0238312 A1    Oct. 27, 2005

Related U.S. Application Data

(60) Provisional application No. 60/318,189, filed on Sep. 7, 2001.

(51) Int. Cl.
*G02B 6/00* (2006.01)
*C03B 37/15* (2006.01)

(52) U.S. Cl. .......................... 385/137; 385/14; 385/54; 385/49; 385/80; 385/114; 385/115; 65/406; 65/408

(58) Field of Classification Search ................ 385/114, 385/115, 116, 14, 92, 94, 49, 88, 89, 54, 55, 385/59, 63, 65, 77, 71, 43, 50, 80, 136, 137; 65/406, 407, 408, 385
See application file for complete search history.

(56) References Cited

U.S. PATENT DOCUMENTS

| | | |
|---|---|---|
| 4,214,810 A | 7/1980 | Stewart |
| 4,444,458 A | 4/1984 | Stowe et al. |
| 4,444,460 A | 4/1984 | Stowe |
| 4,533,208 A | 8/1985 | Stowe |
| 4,702,547 A | 10/1987 | Enochs |

(Continued)

FOREIGN PATENT DOCUMENTS

EP    0 996 008 A2    4/2000    ............. 385/115 X

(Continued)

*Primary Examiner*—Brian M. Healy
(74) *Attorney, Agent, or Firm*—Jonathan D. Baskin (57) ABSTRACT

In accordance with the present invention a fiber optic array is provided. The array includes a substrate having a fiber support surface. The array further includes an optical fiber having a fiber portion that includes an un-jacketed, un-buffered optical core segment. The un-jacketed, un-buffered optical core segment is placed in contact with the fiber support surface to orient the optical core segment at a selected position relative to the support surface. In addition, the array includes a solder glass chemically bonded to the optical core segment and the fiber support surface so that the optical core segment is secured at a predetermined location relative to the support surface of the substrate. A method for fabricating such a fiber optic array is also provided.

19 Claims, 8 Drawing Sheets

U.S. PATENT DOCUMENTS

| | | |
|---|---|---|
| 4,779,788 A | 10/1988 | Rossberg |
| 4,784,716 A | 11/1988 | Rand et al. |
| 4,880,494 A | 11/1989 | Kaukeinen et al. ......... 156/633 |
| 4,933,030 A | 6/1990 | Dietz |
| 4,945,071 A | 7/1990 | Friesen et al. |
| 5,231,682 A | 7/1993 | Khavand |
| 5,334,558 A | 8/1994 | Dietz et al. |
| 5,500,917 A | 3/1996 | Daniel et al. |
| 5,560,760 A | 10/1996 | Toeppen |
| 5,682,453 A | 10/1997 | Daniel et al. |
| 5,764,833 A * | 6/1998 | Kakii et al. ................... 385/54 |
| 5,835,659 A | 11/1998 | Ota et al. |
| 5,991,492 A | 11/1999 | Ota et al. |
| 6,103,344 A | 8/2000 | Ota et al. |
| 6,215,944 B1 | 4/2001 | Ota et al. |
| 6,216,939 B1 | 4/2001 | Thackara |
| 6,621,976 B1 | 9/2003 | Han et al. |
| 6,721,479 B1 | 4/2004 | Lasecki et al. |
| 6,819,858 B1 * | 11/2004 | Steinberg et al. ........... 385/137 |
| 2003/0169994 A1 * | 9/2003 | Steinberg et al. ........... 385/137 |
| 2005/0238312 A1 * | 10/2005 | Meder et al. ............... 385/137 |

FOREIGN PATENT DOCUMENTS

| | | |
|---|---|---|
| WO | WO 03/023460 | 3/2003 |

* cited by examiner

GLASS BONDED FIBER ARRAY AND METHOD FOR THE FABRICATION THEREOF

RELATED APPLICATIONS

This application is a National Stage of International Application No. PCT/US02/28765, filed Sep. 9, 2002, which claims the benefit of U.S. Provisional Application No. 60/318,189, filed on Sep. 7, 2001, the entire contents of which application(s) are incorporated herein by reference.

FIELD OF THE INVENTION

The present invention relates generally to fiber optic arrays, and more particularly to fiber optic arrays having un-buffered, un-jacketed optical fibers secured to a support element with a solder glass.

BACKGROUND OF THE INVENTION

Use of multiple optical channels, such as optical fibers, has become prevalent in applications ranging from data communications to optical computing in response to a need for increased system bandwidth. At the same time, miniaturization still remains an important goal in these applications. High fiber packing density assists in effecting miniaturization and increasing the space-bandwidth product. In addition, precise positioning of the fiber core is a critical goal in achieving acceptable system performance, since the fiber core must be precisely registrable to other devices or fibers of the system. A fiber array provides a desirable way for handling multiple optical fibers while attempting to effect miniaturization and providing precision registration among the fibers.

Typically, a fiber includes an inner core and cladding enclosed within a buffer and an outer jacketing. For maximizing packing density, only the information carrying portions of the fiber, core and surrounding cladding, need be accessible at the input and output portions of an array. The buffer and jacketing, which typically surround the cladding, provide structural support for the core and cladding but perform no optical function. For example, a fiber may have a jacketing diameter of 250 microns and cladding diameter of 125 microns. Therefore, removal of the jacketing and any intermediate buffer permits an increase in the linear packing density by a factor of 2.

In addition to the desirability of providing high packing density, providing precise and stable positioning of one fiber core relative to another is critical to optical performance. Without precise relative positioning among the signal-carrying portions of fibers, i.e., the fiber core, unacceptably large variation or degradation in optical performance, such as coupling and insertion losses, may result. Movement or misalignment between fiber cores on the sub-micron scale may give rise to such unacceptable performance. For example, a core diameter of 8 microns is a typical dimension in single-mode fibers having the above-listed jacketing and cladding diameters. Thus, movement or misalignment of the optical core by even 1 micron represents movement or misalignment by a substantial fraction of the core diameter.

In addition, in many applications it becomes highly desirable to provide such sub-micron precision over a product lifetime of 20 years or more. In order to maximize product lifetime for structures that include optical fibers secured to a support element and to each other, the materials and fabrication methods used in the fabrication of fiber arrays must be environmentally stable in order to durably attach the optical fibers to the support element over a period of decades.

One factor in effecting fiber array stability is the choice of bonding material utilized to secure the fibers to the support element. Bonding materials presently used can suffer from a number of deficiencies. For example, presently used bonding materials typically possess a coefficient of thermal expansion unacceptably different from those of the optical fiber and support element to which the fiber is secured. The difference in thermal expansion coefficient may affect the stability and relative position of the fibers when exposed to temperature changes. In addition, some commonly used bonding materials may absorb moisture which can significantly reduces the ability of the bonding material to firmly secure the optical fibers to each other and to the support element. The absorption of moisture may also tend to swell the bonding material, which can cause dimensional changes to the bonding material that strain the attachment between the optical fibers and the support element. For example, movement or even detachment of the optical fibers from the support element may result from the dimensional changes of the bonding material. Furthermore, prolonged exposure to other environmental conditions, such as thermal, oxidative and photo degradation may cause a breakdown of the bonding material over such periods of exposure. Another disadvantage associated with the use of certain bonding materials is the requirement for unacceptably lengthy cure schedules, often at elevated temperatures, which can substantially hinder high volume production.

Hence there remains a need in the art for materials and methods for providing fiber arrays having fiber cores that are precisely positioned and reliably secured relative to one another and to a support element.

SUMMARY

In accordance with the present invention a fiber optic array is provided. The array includes a substrate having a fiber support surface. The fiber support surface provides a fiducial reference against which an optical fiber may be positioned. The array further includes an optical fiber having a fiber portion that includes an un-jacketed, un-buffered optical core segment. The optical core segment includes a core and may include a cladding layer disposed about the core. The un-jacketed, un-buffered optical core segment contacts the fiber support surface to orient the optical core segment at a selected position relative to the support surface. In addition, the array includes a solder glass chemically bonded to the optical core segment and the fiber support surface so that the optical core segment is secured at a predetermined location relative to the support surface of the substrate. Optionally, the solder glass may be provided as two or more layers of solder glass. The solder glass may be chosen so that the bonded solder glass has a coefficient of thermal expansion substantially matched to that of one or more of the core segment and the substrate.

In accordance with another aspect of the invention, a method for fabricating a fiber optic array is provided. The method comprises the step of providing a substrate having a fiber support surface against which an optical fiber may be positioned. The method also comprises the step of providing an optical fiber having a fiber portion that includes an un-jacketed, un-buffered optical core segment. Further, the method includes a step of positioning the optical core segment in contact with the fiber support surface to orient the optical core segment at a selected position relative to the support surface. Optionally, the step of positioning the optical core segment may comprise the step of providing a tool having a fiber registration guide and placing the optical core segment in registry with the fiber registration guide and pressing the optical core segment into the solder glass. In addition, the method includes the step of chemically bonding a solder glass to the optical core segment and the fiber support surface so that the optical core segment is secured at a predetermined location relative to the support surface of the substrate. The step of chemically bonding a solder glass may also comprise the step of heating the solder glass so that the solder glass softens sufficiently to form a chemical bond with the optical core segment and the fiber support surface.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION

The present invention is related to precision mounting of optical fibers to a support element such that the fiber cores are securely and durably attached to the support element at a precisely specified positions relative to a selected feature of the support element to provide an optical fiber array. Providing precise positioning of the fiber core relative to the support element is critical to the ability to register the fiber core with other optical elements when the fiber array is used with other system components. Typically, optical fibers have a central optical core surrounded by a cladding which is covered by a buffer and a jacketing. The precise positioning of the fiber core relative to the support element is afforded by registering an un-buffered, un-jacketed optical fiber segment relative to a fiducial reference surface of the support element. The precisely positioned fiber core is secured in place using a glassy bonding material, such as a solder glass, to durably maintain the location of the fiber core relative to the support element. In particular, the present invention is particularly well-suited to providing an all-glass fiber optic device, such as a fiber optic array, in which the support element, optical fiber, and bonding material are glass-based materials.

Figure 1:
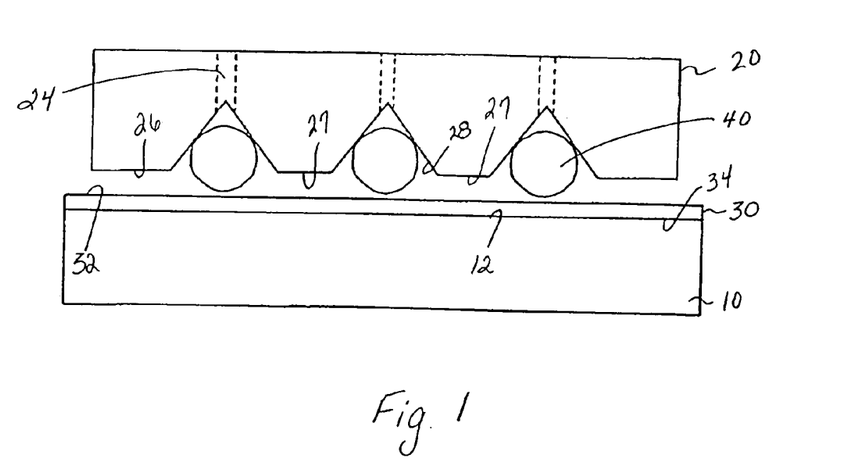
FIG. 1 schematically illustrates a side elevational view of a substrate having a layer of solder glass disposed on a fiber support surface of the substrate and illustrates a tool having fiber V-grooves for retaining a plurality of optical fibers at selected locations relative to one another and relative to the substrate.
Figure 2:
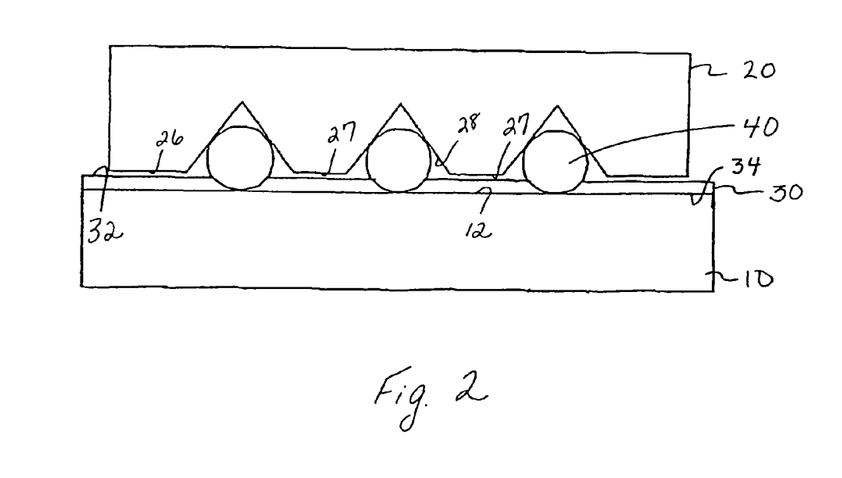
FIG. 2 schematically illustrates a side elevational view of the substrate and tool of FIG. 1 with the tool positioned such that the optical fibers are registered in contact with the fiber support surface of the substrate.
Figure 3:
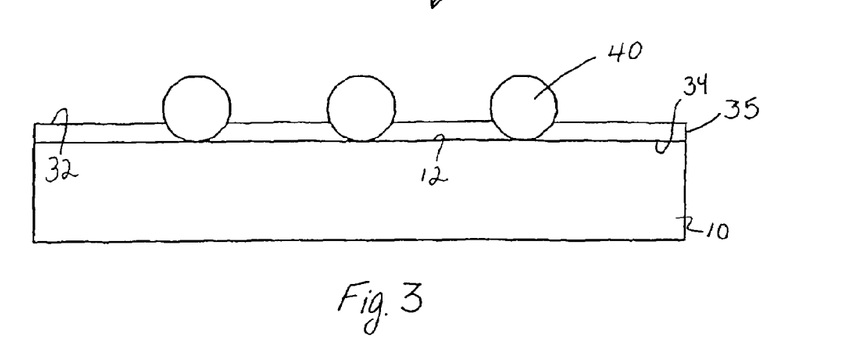
FIG. 3 schematically illustrates a side elevational view of the substrate of FIG. 2 with the tool removed to yield a fiber array of the present invention.

Referring now to the figures, wherein like elements are numbered alike throughout, and in particular to FIGS. 1–3, a fiber optic device and a method for its manufacture in accordance with the present invention are shown. In particular, a fiber optic device of the present invention is illustrated as a fiber optic array, generally designated 100. However, the present invention is not limited to fiber optic arrays but has broader application to any fiber device that benefits from precise positioning and secure mounting of an optical fiber to a support element. As such the present invention is well suited for use in fiber pig-tailed devices and optical device packages incorporating optical fibers or fiber stubs, for example.

Referring now in particular to FIG. 1, a configuration of optical fibers 40, and a support element, substrate 10, is shown from which a fiber optic array 100 may be made in accordance with the present invention. The support element is provided as a substrate 10 having a generally rectangular cross-sectional shape. Although the shape is depicted as a rectangular solid other shapes may be utilized for the substrate 10. The substrate 10 includes a fiber support surface 12 for receiving and supporting the optical fibers 40 at a predetermined location relative to the substrate 10. The fiber support surface 12 may take any shape suited to supporting the optical fibers 40. For example, as illustrated in FIG. 1, the fiber support surface 12 may be a generally planar surface. In addition, the fiber support surface 12 may optionally include one or more registration structures to provide a guide against which a respective optical fiber 40 may be positioned. For example, such a registration structure may take the form of a V-groove recessed into the substrate 10 for receiving an optical fiber 40 therein. Alternatively, a registration structure may take the form a protrusion extending outwardly from the substrate 10 to provide a raised guide against which a respective fiber 40 may be registered.

The substrate 10 may comprise any material suited to providing a support surface 12 for the optical fibers 40 and having material properties compatible with the processing used to create a fiber array 100 whereby the optical fibers 40 are precisely and durably secured to the substrate 10. For example, the substrate 10 may comprise glass, ceramic, metal, fused silica, silicon, lithium niobate, thermoset resin, ZERODUR® and combinations thereof. In particular, the substrate 10 may comprise a glass-based material having one or more physical properties, such as the coefficient of thermal expansion, for example, that are similar to those of the fibers 40. Providing a substrate 10 having a coefficient of thermal expansion sufficiently matched to that of the optical fibers 40 can lead to improved stability of the fiber array 100 relative to temperature changes.

A glassy bonding material, solder glass 30, into which the optical fibers 40 are to be placed, is provided adjacent the fiber support surface 12 of the substrate 10. The solder glass 30 may be provided as a continuous layer on the fiber support surface 12 of the substrate 10 having a thickness sufficient to cause the fibers 40 to be embedded to a selected depth within the solder glass 30 when the fibers 40 are placed in contact with the fiber support surface 12. Alternatively, or additionally, as illustrated in FIG. 9, solder glass 93 may be patterned onto the fiber support surface 92 of the substrate 90 at selected locations at which the optical fibers 94 are to be bonded to the substrate 90. In addition, more than one layer of solder glass 30 may be provided on the substrate 10, as discussed more fully below with reference to FIG. 8.

The solder glass 30 may comprise a variety of different materials, including, but not limited to, lead oxide-based materials, silver phosphate, silver oxide, vanadium oxide, and other glass formers, intermediates, or modifiers. In particular, the solder glass 30 may primarily comprise a glassy bonding material provided in the form of glass particles, such as a glass powder, used for chemically bonding the optical fibers 40 to the substrate 10 upon heating of the solder glass 30. The solder glass 30 may also comprise other constituents such as binders and fillers. Examples of solder glass compositions contemplated for use with the present invention may be found in U.S. Pat. Nos. 5,334,558, 4,945,071, and 4,933,030, the disclosures of which are incorporated herein by reference. Other exemplary materials are commercially available from SEM-COM of Toledo, Ohio, USA. Examples of SEM-COM materials include the following, which have the following properties and nominal compositions (weight %) as provided on the Material Safety Data Sheet.

| SCB-2: Lead-zinc-borate glass | SCB-8: Lead-borate glass |
|---|---|
| <75% PbO, | <90% PbO, |
| <25% B2O3, | <15% B2O3, |
| <10% ZnO, | <5% amorphous SiO2, |
| <5% amorphous SiO2, | <5% Al2O3. |
| <5% Al2O3, | |
| <5% BaO, | |
| <5% CuO. | |
| B-10091: Lead-borate glass | B-10095: Lead-borate glass |
| <90% PbO, | <85% PbO, |
| <10% TiO2, | <10% TiO2, |
| <10% B2O3, | <5% B2O3, |
| <1% amorphous SiO2. | <2% SiO2, |
| | <2% Al2O3. |

TABLE 1

Typical Properties of Selected Solder Glasses

| Property | SCB-2 | SCB-8 | B-10091 | B-10095 |
|---|---|---|---|---|
| Softening Point (° C.) | 445 | 355 | 355 | 355 |
| Sealing Range (° C.) | 500 ± 10 | 405 ± 5 | 415 ± 15 | 415 ± 15 |
| Annealing Point (° C.) | 360 | 310 | 310 | 310 |
| Coefficient of Thermal Expansion, heating (ppm/° C.) | 8.1 | 11.1 | 2.4 | 5.5 |

The solder glass 30 may further include a solvent, such as isopropanol, for example, added to the solder glass 30 to provide a paste or a slurry which may be conveniently applied to the substrate 10. The amount of solvent included in the solder glass 30 may be varied to achieve a desired viscosity of solder glass 30. For example, a relatively small amount of solvent may be provided, so that the solder glass 30 has a thick paste-like consistency so that, once applied to selected elements of the fiber array, such as fiber support surface 12 of the substrate 10, the paste-like solder glass 30 will tend to remain at the location where solder glass 30 was originally applied.

The solder glass 30, has a composition which is selected to have a melting point or glass transition temperature suitable for allowing the glassy bonding material of the solder glass 30, such as the glass particles or glass powder, to soften and chemically bond to the optical fibers 40 and the substrate 10. In particular, the melting point temperature of the glassy bonding material of the solder glass 30 is selected to be lower than the melting point of the clad core of the optical fibers 40 and/or substrate 10, so that the optical fibers 40 and/or substrate 10 are not unacceptably deformed or unacceptably chemically altered, e.g., core diffusion, by application of heat to the solder glass 30 the sufficient to soften the solder glass 30. For example, the solder glass may have a melting temperature of about 350° C. to 450° C.

In addition, it may be particularly desirable that the solder glass 30 have a glass transition temperature substantially above the maximum expected operating temperature of the fiber array 100. For example, if the maximum operating temperature is expected to be 85° C., then the solder glass 30 may desirably have a glass transition temperature of 150° C. or 200° C. In addition to the glass transition temperature characteristics, the glassy bonding material may desirably have a coefficient of thermal expansion substantially matched to that of one or more of the fibers 40 and the substrate 10 to enhance the durability of the fiber array 100 with respect to temperature changes.

Continuing with reference to FIG. 1, a plurality of fibers 40 are held at a desired location relative to the substrate 10 by a tool 20. The tool 20 includes a plurality of registration guides, such as V-grooves 22, against which or in which the fibers 40 may be positioned. For example, as illustrated in FIG. 1, a plurality of V-grooves 22 may be provided in a fiber positioning surface 26 of the tool 20 into which the optical fibers 40 may be seated at predetermined locations relative to one another. The V-grooves 22 may be formed in the positioning surface 26 as a series of generally parallel grooves having sidewalls 28 that are inclined with respect to the plane of the positioning surface 26. The registration guides may also be provided in the form of other recessed features having other cross-sectional shapes suitable for retaining the optical fibers 40. Such shapes may include, for example, a U-shaped cross section. The V-grooves 22 may be spaced apart from each other in the transverse direction at a predetermined pitch. As shown in FIG. 1, the V-grooves 22 may be spaced apart a predetermined distance so that flat surfaces 27 of the positioning surface 26 are formed intermediate the longitudinally extending V-grooves 22. The tool 20 may also optionally include one or more vacuum ports 24 disposed in gaseous communication with the V-grooves 22 so that a suctioning force may be provided to the V-grooves 22 to retain the optical fibers 40 in contact with the V-groove sidewalls 28.

The optical fibers 40 may be provided as un-buffered, un-jacketed fiber optic segments that include the fiber core and cladding in order to provide fiber optic segments in which the optical cores can be located with a sufficient degree of precision relative to the substrate 10. Optionally, the cladding need not be provided so long as the materials of the assembled fiber array 100 that contact the fiber core, such as the solder glass 30 and the substrate 10, have optical properties sufficient to maintain the desired light carrying properties of the fiber core. Providing optical fibers 40 that have no buffer or jacketing is crucial to providing a precise location of the fiber core relative to the substrate 10 for many of the commercially available optical fibers, because the dimensional tolerances, such as diameter and concentricity, of the buffer and jacketing are not sufficiently well controlled to provide registration from the buffer or jacketing to provide sufficiently precise location of the fiber core. In contrast, the dimensional tolerances of the core and cladding are sufficiently precise.

In particular, the concentricity of the buffer and jacketing relative to the clad core can exhibit an unacceptably large variation and therefore frustrate registering the optical core of a first fiber 40 to the core of a second fiber 40 when such registration is made by reference to the respective buffers or jacketing. For example, for a commonly used single-mode fiber, SMF-28® fiber of Corning, N.Y., the location of the core relative to the cladding, i.e., the core-clad concentricity, is accurate within 0.5 microns. However, the location of the buffer relative to the cladding, i.e., buffer-cladding concentricity, may vary by as much as 12 microns. Registration of the buffer of one optical fiber relative to the buffer of another optical fiber, could therefore result in relative placement of the respective clad cores that differ by as much as 24 microns. Thus, two fibers butt-coupled to one another by registration of the respective buffers can result in a configuration where the respective fiber cores are misaligned by up to 24 microns. Since the fiber cores are 8 microns in diameter, a misalignment of greater than 8 microns between the two fiber cores creates a connection in which no optical energy is transmitted from the first fiber to the second fiber. Hence, registration uncertainty as to the location of the 8 micron fiber core by as much as 12 microns within the fiber optic array 100, can render the fiber optic array 100 unusable, since other optical componentry cannot be readily and reliably positioned relative to the fiber core. For these reasons, the optical fibers 40 are provided without a buffer or jacketing in the region where the optical fibers 40 are retained in the tool 20 and contact the fiber support surface 12 of the substrate 10.

Returning to the description of the tool 20, the V-grooves 22 of the tool 20 are dimensioned to enable un-buffered, un-jacketed optical fibers 40 to be held in place by the V-grooves 22 so that the fibers 40 extend beyond the positioning surface 26 of the tool 20. As a result, a portion of the fibers 40 protrude a sufficient distance to enable the fibers 40 to contact the fiber support surface 12 of the substrate 10 when the fibers 40 are pressed into contact with the substrate 10 by the tool 20, as seen in FIG. 2. In particular, the depth of the V-grooves 22 and width of the V-grooves 22 in the transverse direction may be selected to ensure two-point contact between the cladding 42 and the V-grooves 22 as well as contact with the fiber support surface 12 of the substrate 10, as shown in FIG. 2. The two-point contact with the V-grooves 22 of the tool 20 facilitates precise location of the fibers 40 within the V-grooves 22, which creates improved registration among the locations of the fibers 40 in the V-grooves 22. The V-grooves 22 may be spaced apart at a selected distance as shown in FIGS. 1 and 2, which may be as close together as permitted by the fabrication method in order to maximize the fiber packing density linearly across the width of the array 100.

The tool 20 may comprise any material suited to retaining the optical fibers 40 and having material properties compatible with the processing used to create the fiber array 100. For example, the tool 20 may comprise a glass, ceramic, silicon, thermoset resin, and combinations thereof. In addition, if the tool 20 is to come into contact with the softened solder glass 30 during fabrication of the fiber array 100, it may be desirable for the tool 20 to comprise a material that does not stick to the softened solder glass 30. Non-stick properties of the tool 20 may be provided by a layer on the surface of the tool 20 that comes into contact with the softened soldered glass 30. For example, the tool 20 may be coated with platinum, gold, boron nitride, or other such suitable materials.

Furthermore, if the tool 20 is to be included as a component of the final fiber array 100, then the tool 20 may comprise a material having a coefficient of thermal expansion similar to that of one or more of the fibers 40, the substrate 10, and the solder glass 30. In such a case, providing a tool 20 having a coefficient of thermal expansion sufficiently matched to that of the optical fibers 40 can lead to an improved stability of the fiber array 100 a upon exposure to temperature changes. It may be desirable, however, not to include the tool 20 as a component of the final fiber array 100, to decrease the cost of the fiber array 100.

Referring now to FIGS. 1–3, a method for forming a fiber array 100 in accordance with the present invention is to be described. As shown in FIG. 1 and explained above, the substrate 10 is provided with a layer of solder glass 30 disposed on the fiber support surface 12. The tool 20 is positioned at a selected location above the layer of solder glass 30 while retaining the optical fibers 40 within the V-grooves 22 of the tool 20 and out of contact with the solder glass 30. The tool 20 is moved towards the substrate 10 a sufficient distance to cause the fibers 40 to come into registered contact with the fiber support surface 12 of the substrate 10, as shown in FIG. 2. If the viscosity of the solder glass 30 is sufficiently low at ambient temperature to permit the fibers 40 to contact the fiber support surface 12, the tool 20 may be moved while the solder glass 30 is at ambient temperature. Instead, the solder glass 30 may be heated prior to movement of the tool 20, for example to lower the viscosity of the solder glass 30 to permit the optical fibers 40 to contact the fiber support surface 12 of the substrate 10.

While the optical fibers 40 are positioned at the desired location in contact with the fiber support surface 12, sufficient heat is provided to the solder glass 30 to cause the solder glass 30 to become soft or tacky so that the glassy bonding material of the solder glass 30 chemically bonds the fibers 40 to the substrate 10. The heat may be provided by any device that provides a sufficient magnitude and suitable type of energy for softening the solder glass 30. For example, the glassy bonding material of the solder glass 30 may be heated by microwave radiation, thermal energy, electromagnetic radiation, infrared radiation, ion bombardment, or combinations thereof. The solder glass 630 need not be heated to a temperature sufficient to completely liquefy the glassy bonding material, although such a liquefying temperature may be utilized so long as the desired registration among the fibers 40 is maintained along with the desired optical properties of the fibers 40. During heating of the solder glass 30, it is contemplated that the non-glassy bonding material, e.g., the solvent and binder, may be burned away so that substantially only the glassy bonding material remains in the bonded solder glass 35, as shown in FIG. 3.

Figure 4:
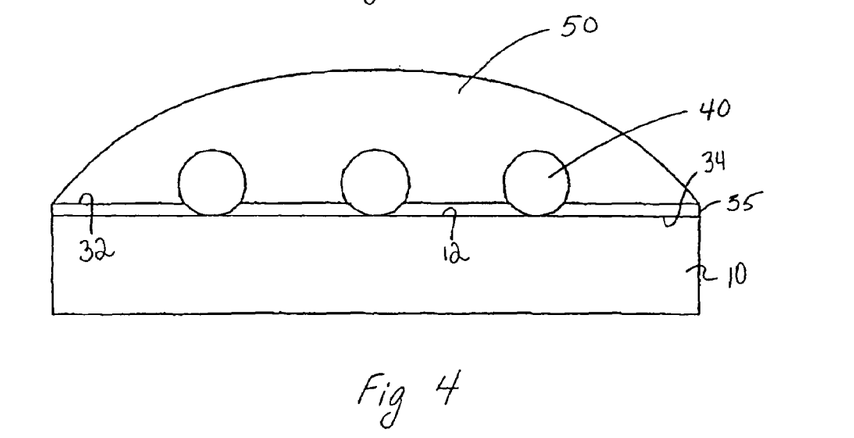
FIG. 4 schematically illustrates a side elevational view of the substrate of FIG. 3 with a protective material covering the optical fibers.

After sufficient cooling of the solder glass 30 to secure the fibers 40 in position, the tool 20 may be removed and the bonded solder glass 35 and other heated structures cooled, to yield the fiber array 100 in which the optical fibers 40 are precisely and durably secured to the substrate 10. After bonding, the endfaces of the bonded fibers 40 may be conveniently polished along with the adjacent edge of the substrate 10. In addition, to further cover and protect the bonded fibers 40, a covering material 50 may be provided about the bonded fibers 40 to encapsulate the fibers 40, as illustrated in FIG. 4. The covering material 50 may include epoxy, resins, solder glass, or other materials having desirable properties for protecting the optical fibers 40 from environmental conditions to which the fiber array 100 may be subjected. In particular, it may be desirable to choose the covering material 50 such that the coefficient of thermal expansion of the covering material 50 is substantially matched to that of one or more of the optical fibers 40, bonded solder glass 35, and substrate 10. If the covering material 50 is heated during its application to the fiber array 100, it may be desirable that the temperature to which the covering material 50 is heated be lower than the temperature needed to softened the bonded solder glass 35 so that the bonded fibers 40 do not moved relative to the substrate 10 when the heated covering material 50 is applied to the fiber array 100.

Figure 5:
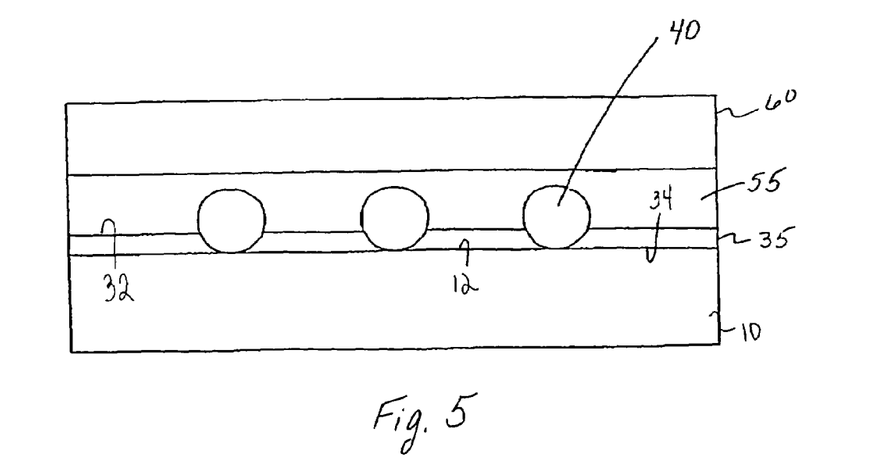
FIG. 5 schematically illustrates a side elevational view of the substrate of FIG. 3 with an lid substrate sealed onto the optical fibers with a bonding material.

As a further option, a lid 60 may be provided to cover and enclose the bonded optical fibers 40, as illustrated in FIG. 5. The lid 60 may be secured to the bonded fibers 40 by a bonding material 55. The bonding material 55 may include epoxy, resin, solder glass, or other materials sufficient to secure the lid 60 to the fibers 40. In particular, the bonding material 55 may be a solder glass having a softening temperature lower than the softening temperature of the bonded solder glass 35 so that the bonded fibers 40 do not move relative to the substrate 10 when the heated bonding material 55 is applied to the fiber array 100.

Figure 7A:
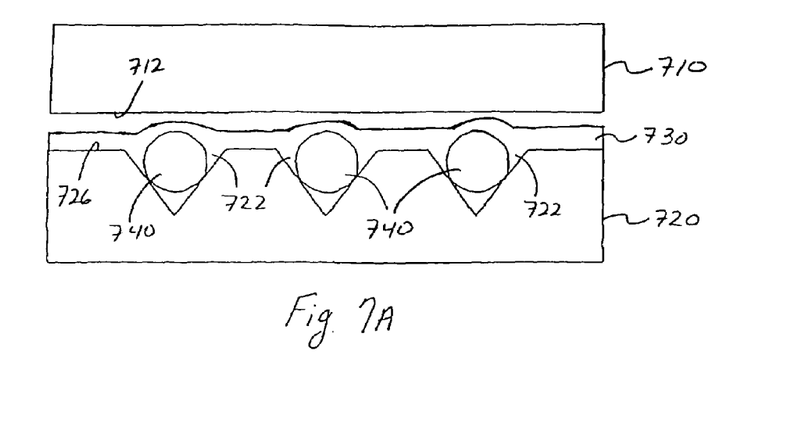
FIG. 7A schematically illustrates a side elevational view of a substrate and a tool that has a plurality of optical fibers disposed in fiber-retaining V-grooves with a layer of solder glass covering the optical fibers.
Figure 7B:
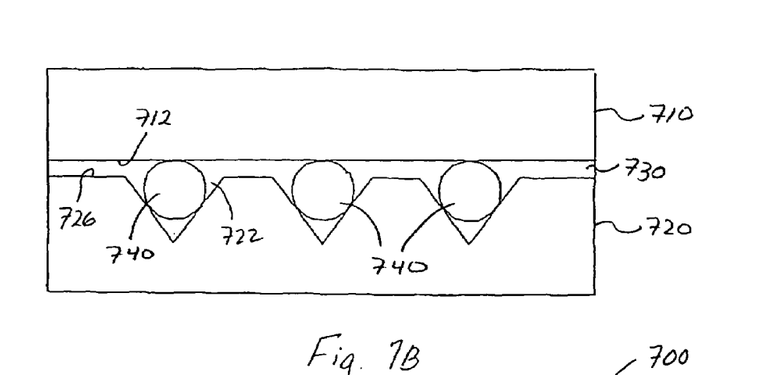
FIG. 7B schematically illustrates a side elevational view of the substrate and tool of FIG. 7A with the tool positioned such that the optical fibers are registered in contact with the substrate and with solder glass filling regions between the optical fibers and V-grooves.
Figure 7C:
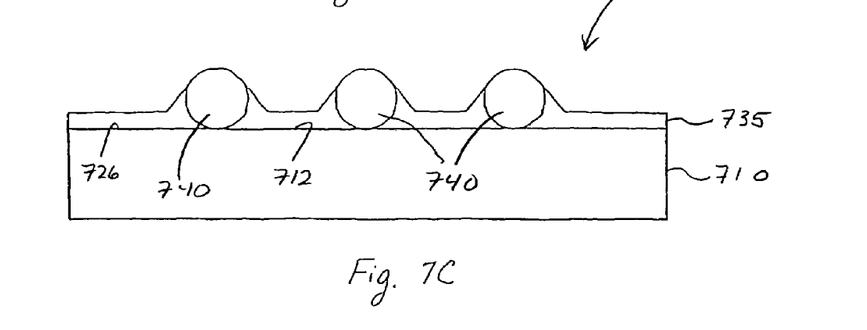
FIG. 7C schematically illustrates a side elevational view of the substrate of FIG. 7B with the tool removed and with sloped side-wall tool imprints formed in the solder glass.

An alternative method for assembling a fiber optic array 700 in accordance with the present invention is illustrated in FIGS. 7A–7C. Referring to FIG. 7A, a substrate 710, tool 720, optical fibers 740, and solder glass 730 are shown, each of which may be similar in composition and structure to like-named elements of FIG. 1. One difference is that the tool 720 need not include vacuum ports as did the tool 20 illustrated in FIG. 1.

The process of assembling the fiber optic array 700 includes the step of positioning the optical fibers 740 in the V-grooves 722 of the tool 720. The tool 720 is oriented so that the V-grooves 722 are located in the upper surface 726 of the tool 720, whereby the force of gravity may be sufficient to retain the optical fibers 740 in contact with the sidewalls 728. A layer of solder glass 730 is deposited about the optical fibers 740 on the upper surface 726 of the tool 720. The substrate 710 and tool 720 are moved towards one another to bring the fiber support surface solder 712 of the substrate 710 into contact with the optical fibers 740, as shown in FIG. 7B.

While the optical fibers 740 are positioned at the desired location in contact with the fiber support surface 712, sufficient heat is provided to the solder glass 730 to cause the solder glass 730 to become soft or tacky so that the glassy bonding material of the solder glass 730 chemically bonds the fibers 740 to the substrate 710. The heat may be provided by any of the means indicated above. The solder glass 730 need not be heated to a temperature sufficient to completely liquefy the glassy bonding material, although such a liquefying temperature may be utilized so long as the desired registration among the fibers 740 is maintained along with the desired optical properties of the fibers 740. During heating of the solder glass 730, it is contemplated that the non-glassy bonding material may be burned away so that substantially only the glassy bonding material in the bonded solder glass 735 remains, as shown in FIG. 7C. After sufficient cooling of the solder glass 730 to secure the fibers 740 in position, the tool 720 may be removed and the bonded solder glass 735 and other heated structures further cooled to yield the fiber array 700 in which the optical fibers 740 are precisely and durably secured to the substrate 710.

Figure 8:
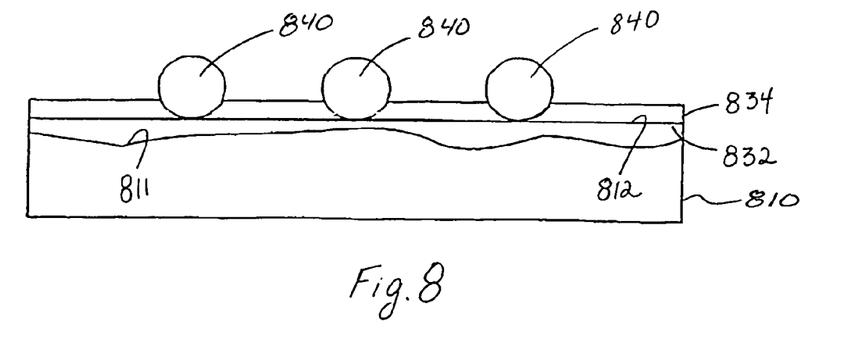
FIG. 8 schematically illustrates a side elevational view of a substrate having an irregular upper surface on which a first solder glass is disposed to provide a fiber support surface on which a plurality of optical fibers are disposed.
Figure 9:
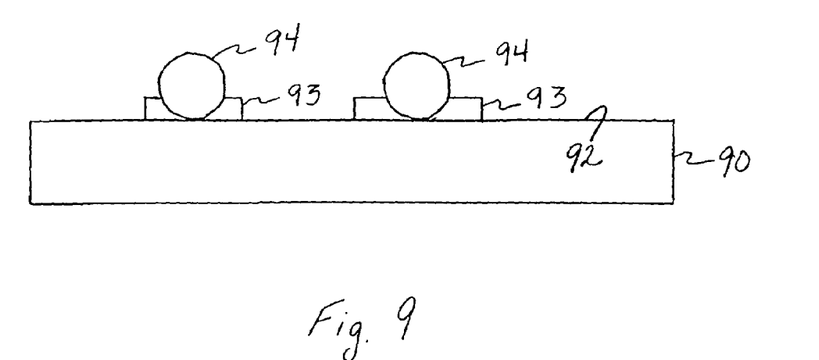
FIG. 9 schematically illustrates a side elevational view of a substrate having a fiber support surface on which solder glass is patterned to provide solder glass regions at which optical fibers may be secured to the substrate.

Yet another configuration of a fiber array 800 which is formed from a substrate 810 having a rough upper surface 811 is contemplated in accordance with the present invention, as illustrated in FIG. 8. The substrate 810 has a rough upper surface 811 which has a shape that may not be desirable for providing a mounting surface for the fibers 840. Accordingly, a first solder glass layer 832 is provided adjacent the rough upper surface 811 of the substrate 810 to provide a fiber support surface 812 having a desirable shape, such as a plane. The first solder glass layer 832 may be applied to the substrate 810 prior to application of an upper solder glass layer 834 and the optical fibers 840. The first solder layer 832 may be heated to at least its softening temperature and may even be heated to its melting temperature, so that a fiber support surface 812 having a desired geometry may be provided. The desired geometry may be formed simply by flow of the melted first solder layer 832. Alternatively, or additionally, the desired geometry of the fiber support surface 812 may be imparted to the softened or molten first solder layer 832 by imprinting the first solder layer 832 with an appropriate tool.

After heating, the first solder layer 832 may be partially cooled or completely cooled to ambient temperature prior to application of a upper solder layer 834 over the first solder layer 832. The upper solder layer 834 may desirably have a melting point that is lower than the melting point of the first solder layer 832. After application of the upper solder layer 834, the fibers 840 are pressed into the upper solder glass layer 834 so that the fibers 840 contact the fiber support surface 812 of the first solder glass layer 832. The fibers 840 may be pressed into the upper solder glass layer 834 using a tool in analogous fashion to that used in fabrication of the fiber optic array 100.

While the optical fibers 840 are positioned at the desired location in contact with the fiber support surface 812, sufficient heat is provided to the upper solder glass layer 834 to cause the upper solder glass layer 834 to become soft or tacky so that the glassy bonding material of the upper solder glass layer 834 chemically bond the fibers 840 to the first solder glass layer 832. In this configuration, the upper solder glass layer 834 functions to bond the optical fibers 840 to the fiber support surface 812 of the first solder glass layer 832, thus bonding the optical fibers 840 to the substrate 810. It may be desirable that the temperature to which the upper solder glass layer 834 is heated be lower than the temperature needed to soften the first solder glass layer 832 so that the fiber support surface 812 does not deform to allow the fibers 840 to move relative to the substrate 810 during bonding. After heating of the upper solder glass 834, the device is cooled to yield the fiber array 800 and which the optical fibers 840 are precisely and durably secured to the substrate 810.

Figure 6A:
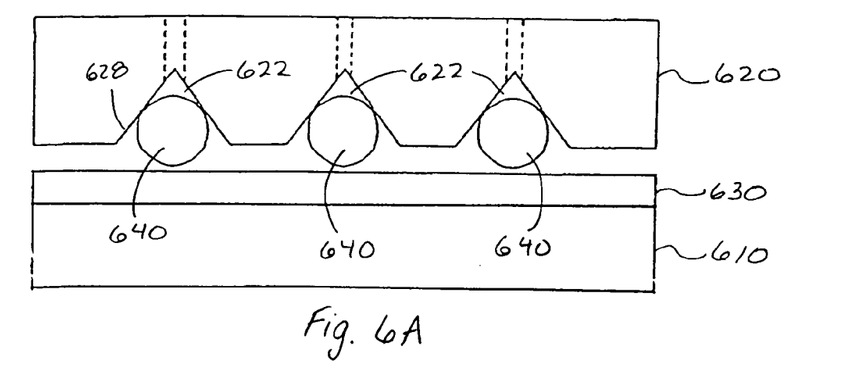
FIG. 6A schematically illustrates a side elevational view of a substrate and tool configuration similar to that of FIG. 1, but with a thicker solder glass layer to provide a sufficient amount of solder glass to allow for a tool imprint to be formed in the solder glass.
Figure 6B:
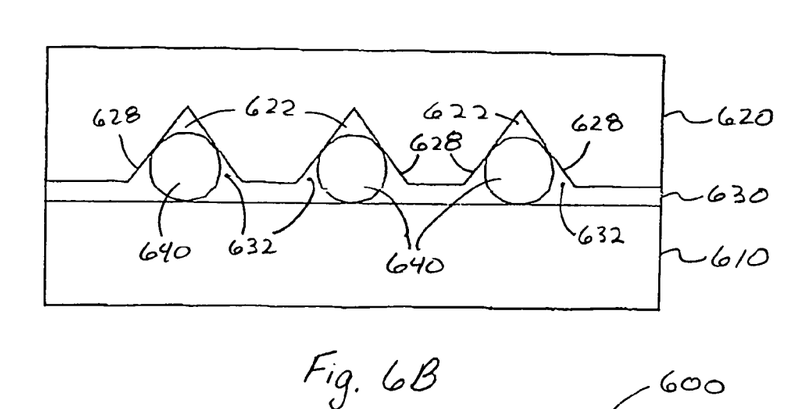
FIG. 6B schematically illustrates a side elevational view of the substrate and tool of FIG. 6A with the tool positioned such that the optical fibers are registered in contact with the substrate and with solder glass filling accessible regions between the optical fibers and V-grooves.
Figure 6C:
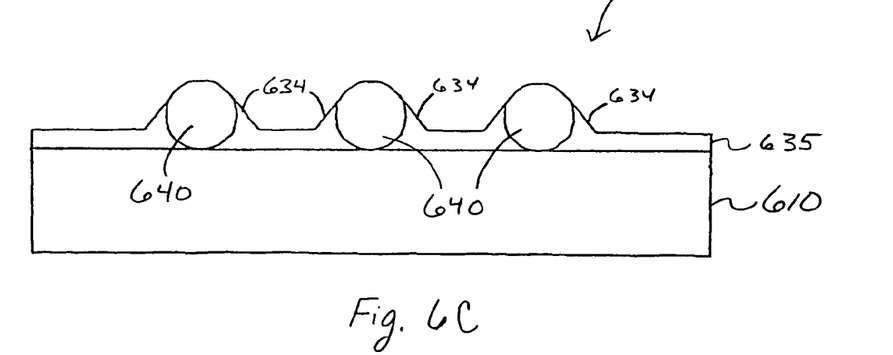
FIG. 6C schematically illustrates a side elevational view of a fiber array of FIG. 6B with the tool removed and with sloped side-wall tool imprints formed in the solder glass in regions about the fibers.

Yet another configuration of the optical fiber array 600 in accordance with the present invention is illustrated in FIG. 6C, in which an imprint 634 from the tool 620 is provided in the bonded solder glass 635 of the fiber array 600. Referring to FIG. 6A, a substrate 610, tool 620, optical fiber 640, and solder glass 630 are shown, each of which may be similar in composition and structure to like-named elements of FIG. 1. One difference is that the thickness of the layer of solder glass 630 is greater so that the solder glass 630 may fill accessible regions 632 between the optical fibers 640 and V-grooves 622. A method for forming the fiber array 600 is illustrated by the sequence illustrated in FIGS. 6A–6C.

The substrate 610 is provided with a layer of solder glass 630 disposed on a fiber support surface 612 of the substrate 610. The tool 620 is positioned at a selected location above the layer of solder glass 630 while retaining the optical fibers 640 within the V-grooves 622 of the tool 620 and out of contact with the solder glass 630. The tool 620 and substrate 610 are moved towards one another a sufficient distance to cause the fibers 640 to come into registered contact with the fiber support surface 612 of the substrate 610, as shown in FIG. 2. If the viscosity of the solder glass 630 is sufficiently low at ambient temperature to permit the fibers 40 to contact the fiber support surface 612, the tool 620 may be moved while the solder glass 630 is at ambient temperature. Instead, the solder glass 630 may be heated prior to movement of the tool 620, for example to lower the viscosity of the solder glass 630 to permit the optical fibers 640 to contact the fiber support surface 612 of the substrate 610 and to permit the solder glass 630 to fill the accessible regions 632 between the optical fibers 640 and the sidewalls 628 of the V-grooves 622.

While the optical fibers 640 are positioned at the desired location in contact with the fiber support surface 612, sufficient heat is provided to the solder glass 630 to cause the solder glass 630 to become soft or tacky so that the glassy bonding material of the solder glass 630 chemically bonds the fibers 640 to the substrate 610. The heat may be provided by any suitable method indicated above. The solder glass 630 need not be heated to a temperature sufficient to completely liquefy the glassy bonding material, although such a liquefying temperature may be utilized so long as the desired registration among the fibers 640 is maintained along with the desired optical properties of the fibers 640. During heating of the solder glass 630, it is contemplated that the non-glassy bonding material, e.g., the solvent and binder, may be burned away so that substantially only the glassy bonding material in the bonded solder glass 635 remains, as shown in FIG. 6C.

After sufficient cooling of the solder glass 630 to secure the fibers 640 in position, the tool 620 may be removed and the bonded solder glass 635 and other heated structures cooled, to yield the fiber array 600 in which the optical fibers 640 are precisely and durably secured to the substrate 610 and in which a tool imprint 634 is provided in the bonded solder glass 635.

EXAMPLE

Figure 10A:
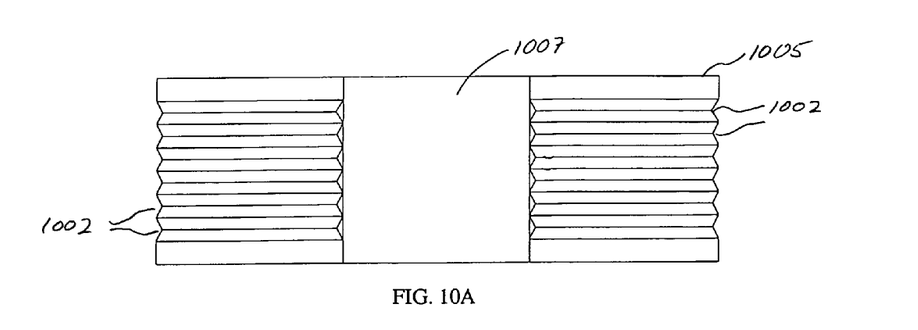
FIGS. 10A and 10B schematically illustrate a top view of and a side elevational view, respectively, of a baseplate for supporting a substrate and a plurality of optical fibers during fabrication of a fiber array in accordance with the present invention.
Figure 10B:
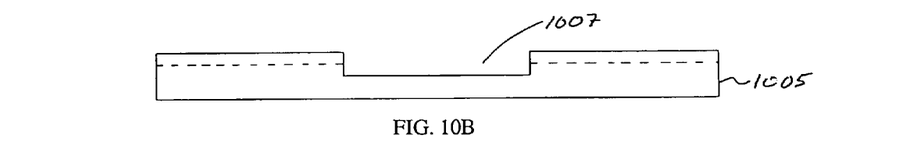
Figure 11:
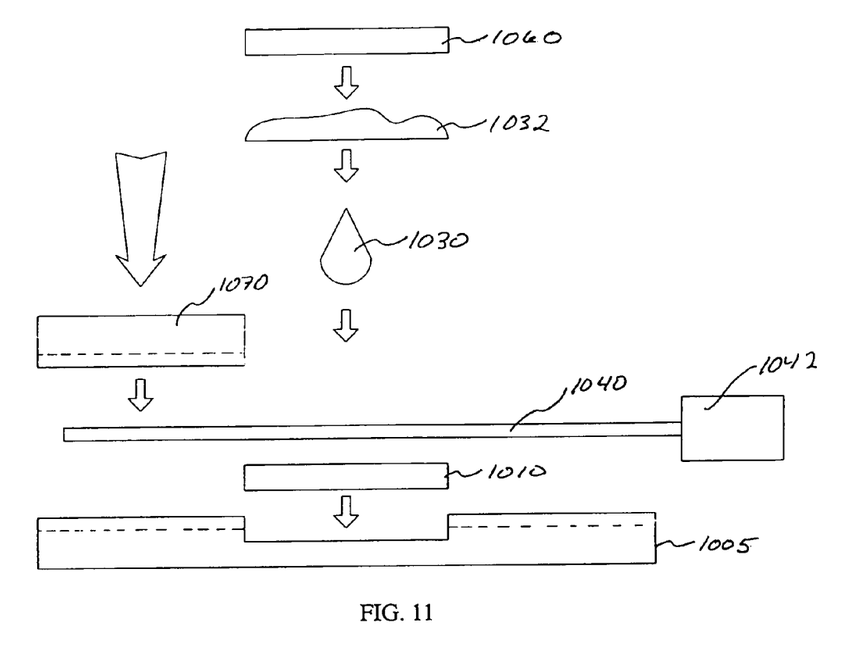
FIG. 11 schematically illustrates a side elevational view of the assembly of the baseplate of FIG. 10B along with additional components for fabricating a fiber array in accordance with the present invention.

A fiber array 1000 was fabricated according to the method illustrated in FIG. 11. A baseplate 1005 formed of an IB chip was provided having a 4 mm wide trench 1007 diced approximately 0.6 mm deep leaving aligned V-grooves 1002 on either side of the trench 1007, is illustrated in FIGS. 10A and 10B. The trench 1007 was dimensioned to accommodate a 0.525 mm thick Pyrex substrate 1010 so that the substrate 1010 would sit just below a Corning 50/125 multimode fiber 1040 positioned in the V-grooves 1002.

As shown in FIG. 11, the substrate 1010 was placed into the trench 1007 in the baseplate 1005 and the un-jacketed; un-buffered portions of the fibers 1040 were secured against the baseplate 1005 with a matching V-grooved lid 1070. The un-jacketed, un-buffered portions of fibers 1040 proximate the substrate 1010 were coated with a very light coat of a SCB-8 slurry (in isopropanol) to assure good adhesion of the fibers 1040 to the substrate 1010. After the solvent was allowed to dry, B-10095 powder was placed over the portions of fibers 1040 proximate the substrate 1010 and a Pyrex lid 1060 was placed on top. The entire assembly was then thermally processed to fuse the glasses. The assembly was heated up to 420–430° C. by placing the assembly on a preheated hot plate. After a 5–10 minute soak at 420–430° C. temperature, the part was cooled at a rate of about 10° C./minute to 310° C. and then soaked for 20 minutes at 310° C. Afterwards the part was cooled to 120° C. maximum at the rate of about 10° C./minute of cooling.

Figure 12:
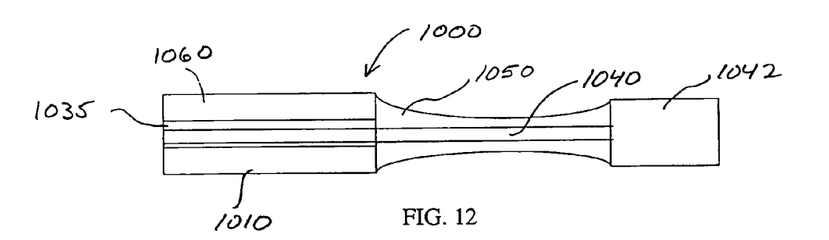
FIG. 12 schematically illustrates a side elevational view of the assembled fiber array of FIG. 11.

After cooling the exposed un-jacketed, un-buffered portions of glass fibers 1040 between the array 1000 and the fiber buffer 1042 were coated with a strain relief material 1050, Dymax 9001 ver 3.1, to protect the fibers 1040 from humidity and stress. The finished part looked schematically as shown in FIG. 12.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A fiber optic array comprising:
    a substrate having a fiber support surface for providing a fiducial reference against which an optical fiber may be positioned;
    an optical fiber having a fiber portion that includes an un-jacketed, un-buffered optical core segment, the optical core segment disposed in contact with the fiber support surface to orient the optical core segment at a selected position relative to the support surface; and a solder glass chemically bonded to the optical core segment and the fiber support surface such that the optical core segment is secured at a predetermined location relative to the support surface of the substrate, wherein the solder glass comprises lead oxide, silver phosphate, silver oxide or vanadium oxide.

2. The fiber optic array according to claim 1, wherein the optical core segment includes a core and a cladding layer disposed about the core.

3. The fiber optic array according to claim 2, wherein the solder glass has a coefficient of thermal expansion substantially matched to that of the cladding layer.

4. The fiber optic array according to claim 1, wherein the solder glass has a coefficient of thermal expansion substantially matched to that of the optical core segment.

5. The fiber optic array according to claim 4, wherein the solder glass has a coefficient of thermal expansion substantially matched to that of the substrate.

6. The fiber optic array according to claim 1, wherein the fiber support surface comprises a planar surface.

7. The fiber optic array according to claim 1, wherein the solder glass comprises a first solder glass layer in contact with the substrate and a second solder glass layer disposed over an upper surface of the first solder glass layer.

8. The fiber optic array according to claim 7, wherein the upper surface of the first solder glass layer comprises the fiber support surface.

9. The fiber optic array according to claim 7, wherein the melting point of the first solder glass layer is higher than the melting point of the second solder glass layer.

10. The fiber optic array according to claim 1, wherein the substrate comprises at least one of a glass, ceramic, silicon, and a thermoset resin.

11. The fiber optic array according to claim 1, wherein the solder glass comprises a continuous layer.

12. The fiber optic array according to claim 1, wherein the solder glass is patterned onto the substrate at selected locations for receiving optical fiber segments.

13. A method for fabricating a fiber optic array comprising the steps of:

providing a substrate having a fiber support surface against which an optical fiber may be positioned;

providing an optical fiber having a fiber portion that includes an un-jacketed, un-buffered optical core segment;

positioning the optical core segment in contact with the fiber support surface to orient the optical core segment at a selected position relative to the support surface; and chemically bonding a solder glass to the optical core segment and the fiber support surface such that the optical core segment is secured at a predetermined location relative to the support surface of the substrates, wherein the solder glass comprises lead oxide, silver phosphate, silver oxide or vanadium oxide.

14. The method according to claim 13, wherein the step of positioning the optical core segment comprises the step of providing a tool having a fiber registration guide and comprises placing the optical core segment in registration with the fiber registration guide.

15. The method according to claim 14, wherein the step of chemically bonding a solder glass comprises the step of providing a solder glass over the optical core segments that are in registration with the fiber registration guide.

16. The method according to claim 13, wherein the step of chemically bonding a solder glass comprises the step of providing a solder glass on the fiber support surface of the substrate.

17. The method according to claim 16, wherein the step of positioning the optical core segment comprises the step of providing a tool having a fiber registration guide and comprises placing the optical core segment in registry with the fiber registration guide and pressing the optical core segment into the solder glass.

18. The method according to claim 16, wherein the solder glass has a paste-like consistency.

19. The method according to claim 13, wherein the step of chemically bonding a solder glass comprises the step of heating the solder glass so that the solder glass softens sufficiently to form a chemical bond with the optical core segment and the fiber support surface.

* * * * *